United States Patent [19]

Urquhart

[11] 4,135,723
[45] Jan. 23, 1979

[54] PISTON ROD SEAL

[75] Inventor: William J. Urquhart, Tumbi Umbi, Australia

[73] Assignee: F.B.J. Engineering Services Pty, Ltd., Granville, Australia

[21] Appl. No.: 833,746

[22] Filed: Sep. 16, 1977

Related U.S. Application Data

[62] Division of Ser. No. 639,045, Dec. 9, 1975, Pat. No. 4,048,908.

[30] Foreign Application Priority Data

Dec. 9, 1974 [AU] Australia .................................. 76169

[51] Int. Cl.² .......................... F01B 31/10; F16J 15/40
[52] U.S. Cl. ...................................... 277/203; 277/53; 92/162 R; 92/165 R
[58] Field of Search ............. 92/158, 159, 162, 165 R; 277/135, 53, 203, 214, 215, 226

[56] References Cited

U.S. PATENT DOCUMENTS

| 2,795,195 | 6/1957 | Amblard et al. | 277/135 X |
| 3,035,879 | 5/1962 | Hanny et al. | 92/162 R X |
| 3,273,906 | 9/1966 | Pennington | 277/53 X |
| 4,010,960 | 3/1977 | Martin | 277/203 X |

FOREIGN PATENT DOCUMENTS

| 489469 | 7/1938 | United Kingdom | 277/53 |
| 752329 | 7/1956 | United Kingdom | 277/135 |

*Primary Examiner*—Robert S. Ward, Jr.

[57] ABSTRACT

A piston for use in a hydraulic or other fluid operated device having sealing means intended to prevent the passage of working fluid between the piston and cylinder in which it moves consisting of the combination of at least one O ring or other sealing device arranged around the circumference of the piston and left and right hand intersecting helical channels formed over the length of the surface of the piston wall between the sealing device and the end of the piston subject to pressure of the working fluid. The helical channels act both to retain lubricating fluid and to provide a partial seal against the passage of working fluid between the piston and the cylinder, substantially complete sealing being effected by the sealing device.

1 Claim, 1 Drawing Figure

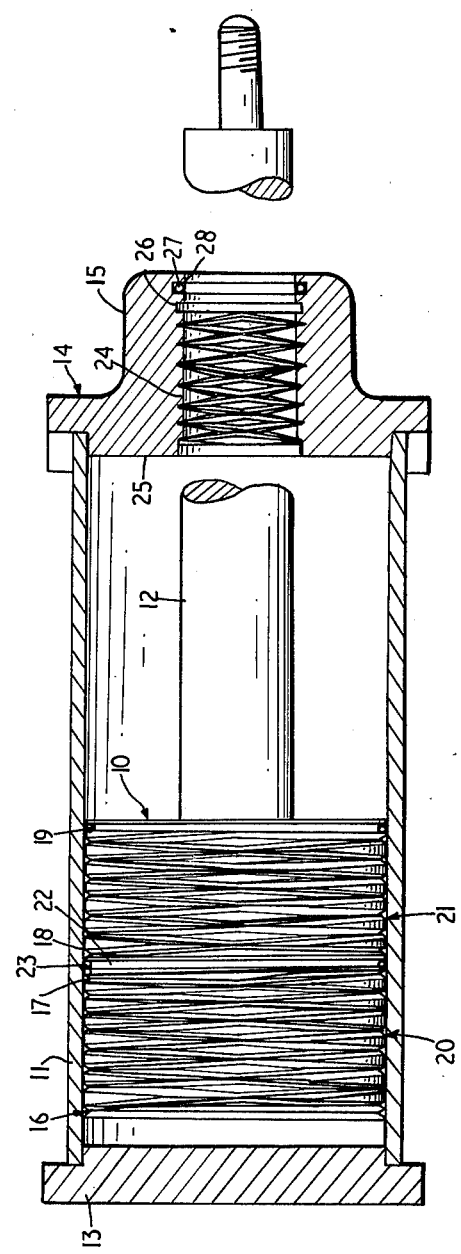

PISTON ROD SEAL

This is a division of application Ser. No. 639,045 filed Dec. 9, 1975, now U.S. Pat. No. 4,048,908.

The present invention is directed to a piston which is to be used in hydraulic and other fluid operated devices in which the piston is required to move in a cylinder in the presence of a fluid under pressure and it is a requirement that leakage past the piston should be eliminated so far as possible.

In hydraulic rams it is the normal practice to provide on the piston some form of elaborate sealing device requiring assembly and close tolerances to prevent leakage of fluid past the piston. Such sealing devices are subjected to very high initial impact loads which tend to produce deterioration and ultimate failure of the sealing devices and which influence substantially the design of the sealing devices; similar considerations apply to piston rod seals used in hydraulic rams.

The object of the present invention is to provide a piston and piston rod seal which are constructed in such a manner that the flow of the fluid under high pressure is retarded and dissipated before reaching a sealing device forming part of the seal so that the initial loading on the sealing device is reduced and its life thus prolonged.

In the specification of Australian Pat. No. 159548 there is disclosed a means for retarding fluid flow under pressure and the dissipation of the fluid pressure, in which the fluid is traversed through right and left hand intersecting helical channels positioned between an inner core and a closely fitting shrouding. It has now been discovered that the principle underlying the invention disclosed in that specification can be applied to the construction of pistons and piston rod seals with a view to achieving the objects set out above.

The present invention consists in a piston for use in a hydraulic ram or other fluid operated device the piston having sealing means intended to prevent the passage of working fluid between the piston and a cylinder in which it moves, said sealing means consisting of at least one O ring or other sealing device arranged around the circumference of the piston and left and right hand intersecting helical channels formed over a length of the surface of the piston wall between the said sealing device and the end of the piston subject to pressure of the working fluid, the said helical channels acting to retain lubricating fluid and to provide a partial seal against the passage of working fluid between the piston and the cylinder, the sealing effect being completed by the said O ring or other sealing device.

It is preferred that the said helical channels terminate at each end in a circumferential groove adapted to form a reservoir of working fluid.

In pistons intended for use in double acting devices said helical channels are provided on each side of the said sealing device.

The invention further consists in a piston rod seal for use in hydraulic rams and other fluid operated devices, said piston rod seal comprising a bore surrounding a piston rod, an O ring or other sealing device in said bore arranged to fit closely around and form a fluid tight seal with said piston rod and left and right hand intersecting helical channels formed over a length of said bore between that end of the seal subjected to a working fluid under pressure and the said sealing device, the said channels terminating at each end in a circumferential groove formed in said bore adapted to form a reservoir of working fluid.

The right and left hand intersecting helical grooves or channels ensure lubrication of the piston and form a partial seal against the passage of working fluid between the piston and the cylinder during movement and the circumferential grooves form a reservoir of working fluid.

In order that the nature of the invention may be better understood a preferred form thereof is hereinafter described by way of example with reference to the accompanying drawing which is a part sectional view of a piston according to the invention, arranged within a cylinder and of a piston rod seal according to the invention.

In the drawing a piston 10 is moveable within a cylinder 11, the piston being attached to one end of a piston rod 12. One end of the cylinder 11 is closed by the closure 13, the other end 14, of the cylinder 11 is provided with a sealing gland 15 through which the piston rod 12 passes.

The piston 10 is provided with circumferential grooves 16, 17, 18, 19. The grooves 16 and 17 are interconnected by right and left hand intersecting helical grooves or channels indicated generally at 20 and the grooves 18 and 19 are similarly interconnected by means of right and left hand intersecting helical grooves or channels indicated generally at 21. Between the grooves 17 and 18 is a groove 22 which contains an O ring seal 23.

The gland 15 also makes use of intersecting right and left hand helical grooves or channels which interconnect circumferential grooves 25 and 26 formed in the bore of the gland. A sealing O ring 27 is accommodated in a groove 28 at the outer end of the gland.

Ports (not shown) for the admission fluid are situated at each end of the cylinder to provide a double acting arrangement. The effect of admitting fluid under pressure to one end of the cylinder is to apply fluid pressure to one end of the piston, the fluid endeavouring to pass between the piston and the cylinder. The initial fluid pressure is directed into the right and left hand helical grooves or channels between that end of the piston and the O ring 23. The initial fluid pressure is retarded and dissipated in the right and left hand helical grooves or channels at the intersecting points thus creating pressure on the cylinder wall and allows the piston to operate on a film of fluid. The helical grooves or channels act as a partial seal against leakage of fluid past the piston, any escape or leakage of fluid being sealed by the O ring. As the pressure is retarded and dissipated the O ring is subjected to considerably less pressure than is normal in fluid or hydraulic cylinders and is devoid of shock and impact losses; when the pressure is applied to the O ring back pressure is created at each intersection of the right and left hand helical and any increase in pressure application increases pressure on the cylinder wall and adds to the positive seal protection afforeded by the O ring. Application of fluid pressure to the other end of the cylinder produces the same result due to the other set of right and left hand helical grooves or channels interposed between the fluid inlet and the O ring.

In a single acting arrangement in which fluid pressure is applied on only one side of the piston with spring or gravity return the position of the O ring in the piston will be near that end remote from the fluid inlet and only one set of right and left hand helical grooves or channels may be provided, preferably terminating in circumferential grooves or channels.

It will be seen that the gland 15 functions in a similar manner, in that the O ring 28 is protected by means of the right and left hand helical grooves or channels 24.

The arrangement described above is given by way of example only and sealing devices other than O rings may be used according to the requirements of the application. The depth, width and pitch of the helical grooves or channels is chosen in accordance with the size of the piston, the nature of the fluid and the condition of operation. Conventional hydraulic rams or cylinders in common use invariably contain an elaborate assembly of a sealing system with gland packing to seal the piston rod. The effect of the right and left hand intersecting grooves or channels and the sealing device of this invention dispenses with the use of such assembly of sealing and gland packing thus resulting in economy and simplification of piston construction and maintenance.

I claim:

1. A piston rod seal for use in hydraulic rams and other fluid operated devices, said piston rod seal comprising a bore surrounding a piston rod, a circumferentially complete sealing device in said bore arranged to fit closely around and form a fluid tight seal with said piston rod, and left and right hand intersecting helical channels formed over a length of said bore between that end of the seal subjected to a working fluid under pressure and the said sealing device, the said channels terminating at each end in a circumferential groove formed around said bore adapted to form a reservoir of working fluid.

* * * * *